United States Patent Office 2,929,762
Patented Mar. 22, 1960

2,929,762

PHOSPHORAMIDATES

Joseph L. Wasco, Midland, Mich., and Lisby L. Wade, Lake Jackson, and James F. Landram, Angleton, Tex., assignors to The Dow Chemical Company, Midland, Mich., a corporation of Delaware No Drawing. Application July 22, 1958
Serial No. 750,103

9 Claims. (Cl. 167—53)

This invention is directed to phosphoramidates having the formula

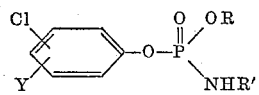

In this and succeeding formulae, R represents a lower alkyl radical containing from 1 to 4 carbon atoms, inclusive, R' is selected from the group consisting of hydrogen and a lower aliphatic radical containing from 1 to 4 carbon atoms, inclusive, Y represents a lower alkyl radical containing from 1 to 5 carbon atoms, inclusive. The invention also relates to methods and compositions for controlling parasites attacking warm-blooded animals.

Domestic animals are subject to attack by a number of different parasites, including fleas, flies, lice, ticks, screw-worms and cattle grubs as well as the helminthic parasites such as lung-worms, stomach-worms and gastro-intestinal worms. The helminthic parasites include the strongyloids, cooperids and ascarids and are the causative agents of ascariasis, trichostrongylosis and gross parasitism. The helminths grow and mature in various organs but particularly the gastro-intestinal tract of their host. In the usual life cycle, the ova pass out of the body with the fecal droppings, hatch and reach their infective stage, whereupon they are ingested during grazing, or as in the case with hook-worms, enter the body through the skin. In the case of ascarids, the swallowed eggs or larvae mature usually in the digestive tract. In other cases the maturing process may take place in other parts of the body such as the liver or the lungs as with lung-worms. The parasites during maturation and growth having a very deleterious effect upon the animal and its rate of growth. In the intestine the parasites erode the epithelial tissues bringing about hemorrhage, anemia, weakness and tissue necrosis. Animals, if they do not succumb to gross parasitism are rendered economically unfit by weakness, lowered vitality, and poor growth and reproduction. It is estimated that the losses accruing to the cattle industry of the United States from gross parasitism amount to about fifty million dollars per year, with yearly losses due solely to mortality running as high as nine million dollars.

One of the undesirable parasites in animals is the cattle grub. This grub is the larval form of the heel fly (*Hypoderma lineatum*), the bomb fly (*Hypoderma bovis*) or the bot fly (*Dermatobia hominis*). The latter fly is found mostly in the Central and South America countries. The heel and bomb flies appear in the United States from February through August and fasten their eggs near the base of the hair on their host. The bot fly is not seasonal in the Central and South American habitat and lays its eggs on an insect such as a mosquito or common fly which carries the eggs to the warm-blooded host. Following their attachment, the eggs of the various flies hatch in four or five days and the larvae bore through the skin of the host. The heel fly larvae migrate to the esophageal region or the abdominal viscera while the bomb fly larvae migrate through the spinal canal. During their life in the host, the larvae feed upon host tissue. After from about three to six months, depending upon the climatic conditions, the larvae locate in the skin and particularly the skin on the back of the host. Here, the larva opens a hole through the skin, usually in the choicest part of the hide, and grows rapidly for about six weeks. The larva thereafter leaves the animal through the hole in the skin, falls to the ground and shortly thereafter, depending upon the prevailing temperature, pupates for its transformation to the adult stage. The organisms cause considerable damage to the carcass of beef animals. In infested areas, losses from beef trimmings and prime leather run as high as ten dollars a carcass. Thus, the yearly loss to the cattle industries of the United States runs into the millions of dollars.

Another undesirable parasite is the screw-worm fly (*Callitroga americana*). It can breed only in the tissues of living warm-blooded animals and it must depend upon finding a wounded or diseased part of the host's body in which its young can begin development. This parasite is particularly prevalent in Southern and Southwestern States and in Central and South American countries. In the areas where it normally occurs, it is one of the greatest enemies of all the insect species with which the livestock owner must contend. Under the present system of livestock production, man-made wounds occasioned by marking, branding, shearing, castrating, dehorning, and docking afford ample and fertile breeding grounds for screw-worms, as do injuries resulting from such plants as cacti and needlegrass, from fighting, from diseased tissues, and from the attacks of blood-sucking insects. Newborn animals are particularly susceptible to infestation of the navel cord.

The fly generally seeks the edges or a dry portion of the wound on which to deposit eggs. The eggs fasten tightly to the tissue surface in compact shinglelike masses. The eggs hatch in about 11 hours and the young whitish worms immediately burrow into the flesh, where they feed and grow for a period of from 4 to 7 days. The worms after attaining full growth in the wound, drop to the ground and change to pupa. After about from 7 to 60 days they emerge as flies. The injury done to the animals is inflicted by the worms or maggots. The debilitating effect and the destruction of tissue kill the infested animals in a few days. The screw-worm destroys untold numbers of domestic and wild animals and this loss costs livestock owners many millions of dollars annually.

The stable fly (*Stomoxys calcitrans*), also called the stock fly and the biting house fly is found in all the temperate regions of the world. The adults, both male and female, are vicious bloodsuckers with long, piercing mouth parts that on penetrating the skin cause considerable pain to animals or human beings. This fly has been shown to be capable of carrying such livestock diseases as anthrax, swamp fever, and surra, as well as infantile paralysis of man. Although the stable fly is principally an annoyance to man and animals, in large outbreaks it frequently kills horses and cattle by causing them continuous worry and loss of blood. The milk production of dairy herds is lowered during every stable fly season, the decrease amounting to as much as 50 percent in seasons when the numbers of flies become large. During such seasons dairy cows and other domestic animals have been known to lose as much as 10 to 15 percent of their weight. Stable flies generally attack the lower parts of the animal's body where the animal's tail is less likely to dislodge them but when flies are abundant, they may attack all parts of the body. Unmolested flies usually engorge to repletion in 2 to 5 minutes. Some control of stable flies may be achieved by use of traps and sprays. Traps cannot be depended on for good control for stable flies remain on animals for only relatively short periods and therefore only those flies that happen to be on an animal will be caught. Sprays employing contact insecticides are effective only for several hours or at most a day or so, thus for good control, frequent spraying is necessary. Furthermore, sprays employing contact insecticides are ineffective against parasites in all stages of growth.

The treatment of these and other parasites by presently employed methods are inadequate for obtaining good control. Some of the known materials have been of little efficacy, others impractical because of the frequency of treatment required, and still others have an adverse effect on the metabolism of the treated animal. The need for simple and inexpensive methods for the control of parasite infection is well recognized as constituting one of the major problems in animal husbandry.

It is an object of the present invention to provide a new class of chemical compounds. A further object is to provide an improved method for controlling parasites attacking warm-blooded animals. Another object is the provision of a method wherein a systemic agent is employed for the control of parasites attacking warm-blooded animals. Another object is to provide a new class of chemical compounds useful for systemic control of parasites. An additional object is the provision of novel compositions adapted to be employed in the new method for controlling parasites. Other objects will become apparent from the following specification and claims.

The new phosphoramidates represented by the structure

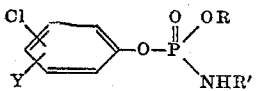

are colorless or light colored liquids or low-melting solids, soluble in many organic solvents and substantially insoluble in water. These compounds are useful for the systemic control of parasites attacking warm-blooded animals. In addition, they may be employed as constituents of insecticidal and microbicidal compositions as well as in herbicidal compositions.

Various methods may be employed in the preparation of the new phosphoramidates. The preferred procedure consists of reacting a haloaryl phosphorodichloridate having the structure

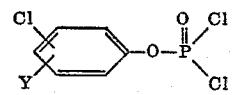

with a lower aliphatic alcohol, ROH, to form an intermediate haloaryl alkyl phosphorochloridate having the structure

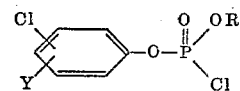

followed by reacting the latter with ammonia or a lower aliphatic amine represented by the structure R'NH₂, to produce the desired phosphoramidate, previously defined. Good yields are obtained in preparations employing substantially equimolar proportions of haloaryl phosphorodichloridate and lower aliphatic alcohol and a mole excess of ammonia or lower aliphatic amine. The reaction may be carried out in an inert organic solvent such as methylene chloride, chlorobenzene, chloroform, benzene and ether. The reaction between the haloaryl phosphorodichloridate and lower aliphatic alcohol is carried out at a room temperature of from about 10° C. to 100°–110° C. The reaction usually is exothermic and temperature control may be maintained by heating or cooling as required. The reaction between the haloaryl alkyl phosphorochloridate and lower aliphatic amine is carried out at a temperature of from 3° to 60° C. with such rate of addition and cooling or heating as required to maintain the temperature in the desired range. The by-product in both steps of the reaction is hydrogen chloride. In the first step, the latter is allowed to exit from the reaction mixture as a gas. In the second step, the hydrogen chloride is removed preferably as a hydrochloride salt of the amine or ammonia. Following completion of the reaction, the phosphoramidate is separated by conventional means.

In a representative preparation, 1 mole of lower aliphatic alcohol in an inert solvent is added portionwise with agitation to 1 mole of haloaryl phosphorodichloridate dispersed in the same solvent, and the mixture agitated for a time sufficient to allow completion of the reaction with the formation of haloaryl alkyl phosphorochloridate intermediate and hydrogen chloride by-product. The hydrogen chloride by-product is removed from the reaction site by agitation and by bubbling an inert gas such as nitrogen through the mixture. The remaining mixture containing haloaryl alkyl phosphorochloridate is cooled to about 15° C. and about 2 moles of ammonia or aliphatic amine added portionwise thereto with cooling and agitation. The resulting mixture was allowed to warm to about 40°–60° C. to complete the reaction with the formation of the desired haloaryl alkyl phosphoramidate product and amine hydrochloride by-product, the latter precipitating in the reaction mixture. The reaction mixture is then washed repeatedly with water to remove the amine hydrochloride or ammonium chloride by-product, and then dried with a drying agent such as calcium sulfate or sodium sulfate. The solvent is removed from the resulting dry solution by vaporization to recover the phosphoramidate product as an oil or solid residue. The latter may be purified by distillation or recrystallization.

The haloaryl phosphorodichloridate employed as starting materials may be prepared by mixing together 1 mole of an appropriate phenol with about 4 moles phosphorus oxychloride in the temperature range of from about 30° to 130° C. in the presence of a catalytic amount of magnesium chloride. Following the reaction the mixture is fractionally distilled under reduced pressure to obtain the desired haloaryl phosphorodichloridate.

The following examples illustrate the invention but are not to be construed as limiting.

*Example 1.—4 - tertiary - butyl - 2 - chlorophenyl methyl methylphosphoramidate*

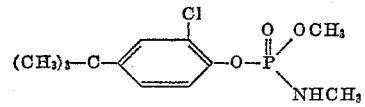

Sixteen grams (0.5 mole) of methanol in 50 milliliters of methylene chloride was added dropwise with stirring to a solution of 151 grams (0.5 mole) of 4-tertiary-butyl-2 chlorophenyl phosphorodichloridate in 400 milliliters of methylene chloride. The temperature of the reaction mixture was maintained below 30° C. during the addition. After completion of the addition, the reaction mixture was maintained at about 25° C. while the mixture was agitated and nitrogen gas was bubbled therethrough to complete the reaction and to remove the hydrogen chloride by-product and to obtain the intermediate 4-tertiary-butyl-2-chlorophenyl methyl phosphorochloridate.

337 grams (one-half of the reaction mixture above prepared containing 0.25 mole of 4-tertiary-butyl-2-chlorophenyl methyl phosphorochloridate) was cooled to 3° C. and a solution of 16 grams (0.5 mole) of methylamine in 50 milliliters of methylene chloride was added thereto portionwise and with stirring over a period of about one-half hour. The temperature was maintained below 15° C. during the addition. After completion of the addition the mixture was warmed to 30° C. to complete the reaction and obtain 4-tertiary-butyl-2-chlorophenyl methyl methylphosphoramidate product and methylamine-hydrochloride by-product. The reaction mixture was then washed several times with water to remove the methylamine-hydrochloride by-product, warmed to remove the methylene chloride solvent by vaporization and to recover the product as a viscous, colorless oil. The latter was crystallized from petroleum ether (boiling range 30°–60° C.) to obtain a purified product melting at 60°–60.5° C. The product had a nitrogen content of 4.90 percent and a phosphorus content of 11.93 percent. The theoretical values are 4.64 percent and 11.78 percent, respectively.

*Example 2.—4 - tertiary - butyl - 2 - chlorophenyl methyl ethyl-phosphoramidate*

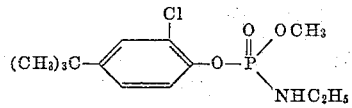

320 grams (10 moles) of methanol in 1400 milliliters of methylene chloride was added portionwise with stirring to a solution of 3015 grams (10 moles) of 4-tertiary-butyl-2-chlorophenyl phosphorodichloridate in 4000 milliliters of methylene chloride. The temperature of the reaction mixture was maintained below 28° C. during the addition. Bubbling of nitrogen gas through the reaction mixture was initiated after about 500 milliliters of the methylene chloride solution of methanol had been added. After completion of the addition, the reaction mixture was maintained between 28° and 44° C. while agitation and passage of nitrogen gas therethrough was continued for a period of 26 hours to complete the reaction and to produce 4-tertiary-butyl-2-chlorophenyl methyl phosphorochloridate intermediate product and to remove hydrogen chloride by-product.

67.5 grams (1.5 mole) of ethyl amine in 150 milliliters of methylene chloride was added portionwise to 750 grams of the solution above prepared containing 0.75 mole of 4-tertiary-butyl-2-chlorophenyl methyl phosphorochloridate while the temperature was maintained below about 15° C. The reaction mixture was gradually allowed to warm to about 30° C. over a period of 3 hours to complete the reaction to produce 4-tertiary-butyl-2-chlorophenyl methyl ethylphosphoramidate product and ethylamine-hydrochloride by-product. The mixture was then washed with water to remove the hydrochloride by-product, heated to vaporize the solvent and to recover 4-tertiary-butyl-2-chlorophenyl methyl ethylphosphoramidate product as a light yellow liquid. 4-tertiary-butyl-2-chlorophenyl methyl ethylphosphoramidate has a molecular weight of 305.8.

*Example 3.—4-tertiary-butyl-2-chlorophenyl methyl tertiary-butylphosphoramidate*

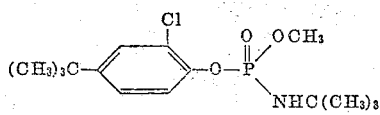

A solution of 16 grams (0.5 mole) of methanol in 50 milliliters of methylene chloride is added dropwise with stirring to a solution of 151 grams (0.5 mole) of 4-tertiary-butyl-2-chlorophenyl phosphorodichloridate in 400 milliliters of methylene chloride while the temperature is maintained below 30° C. After completion of the addition the mixture is maintained in this temperature range while nitrogen gas is bubbled therethrough to complete the reaction, remove the hydrogen chloride by-product and obtain a 4-tertiary-butyl-2-chlorophenyl methyl phosphorochloridate intermediate product.

150 milliliters of methylene chloride is added to the mixture obtained above and 73.1 grams (1.0 mole) of tertiary-butylamine added portionwise to the resulting mixture with cooling and stirring. The mixture is then allowed to stand overnight at room temperature, thereafter washed with water, heated to remove the solvent and to recover a 4-tertiary-butyl-2-chlorophenyl methyl tertiary-butylphosphoramidate product having a molecular weight of 333.8.

*Example 4.—4 - tertiary-butyl - 2 - chlorophenyl normal-butyl methylphosphoramidate*

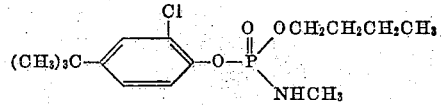

A solution of 16 grams (0.5 mole) of normal-butyl alcohol in 50 milliliters of methylene chloride is added dropwise with stirring and cooling to a solution of 151 grams (0.5 mole) of 4-tertiary-butyl-2-chlorophenyl phosphorodichloridate in 400 milliliters of methylene chloride. The mixture is then stirred and maintained below about 30° C. while nitrogen gas is bubbled therethrough to complete the reaction, remove hydrogen chloride by-product and to obtain a 4-tertiary-butyl-2-chlorophenyl normal-butyl phosphorochloridate intermediate product.

150 milliliters of methylene chloride is added to the above mixture, the mixture cooled, and a solution of 31 grams (1 mole) of methylamine in 50 milliliters of methylene chloride added portionwise thereto with stirring. The mixture is then allowed to stand overnight at room temperature, washed with water, thereafter heated to distill the solvent and recover a 4-tertiary-butyl-2-chlorophenyl normal-butyl methylphosphoramidate product having a molecular weight of 333.8.

*Example 5.—2 - chloro - 4 - isopropylphenyl isopropyl methylphosphoramidate*

A solution of 60 grams (1 mole) of isopropyl alcohol in 50 milliliters of methylene chloride is added dropwise with stirring and cooling to a solution of 288 grams (1 mole) of 2-chloro-4-isopropylphenyl phosphorodichloridate in 500 milliliters of methylene chloride. The mixture is then stirred and maintained below about 30° C. while nitrogen gas is bubbled therethrough to complete the reaction, remove hydrogen chloride by-product and to obtain a 2-chloro-4-isopropylphenyl isopropyl phosphorochloridate intermediate product.

200 milliliters of methylene chloride is added to the above mixture, the mixture cooled, and a solution of 62 grams (2 moles) of methylamine in 100 milliliters of methylene chloride added portionwise thereto with stirring. The mixture is then allowed to stand overnight at room temperature, washed with water, heated to distill the methylene chloride and recover a 2-chloro-4-isopropylphenyl isopropyl methylphosphoramidate product having a molecular weight of 305.8.

*Example 6*

In similar preparations the following phosphoramidates are prepared:

2-chloro-4-methylphenyl ethyl methylphosphoramidate having a molecular weight of 263.6 by the reaction of ethyl alcohol with 2-chloro-4-methylphenyl phosphorodichloridate to produce the intermediate 2-chloro-4-methylphenyl ethyl phosphorochloridate followed by the reaction of the latter with methylamine.

2-chloro-4-ethylphenyl secondary-butyl methylphosphoramidate having a molecular weight of 305.8 by the reaction of secondary-butyl alcohol with 2-chloro-4-ethylphenyl phosphorodichloridate to produce the intermediate 2-chloro-4-ethylphenyl secondary-butyl phosphorochloridate followed by the reaction of the latter with methylamine.

*Example 7.—4-chloro-o-tolyl methyl methylphosphoramidate*

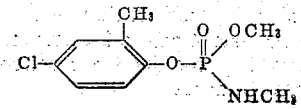

A solution of 16 grams (1 mole) of methanol in 50 milliliters of methylene chloride was added dropwise and with stirring to a solution of 130 grams (0.5 mole) of 4-chloro-o-tolyl phosphorodichloridate in 400 milliliters of methylene chloride while the mixture was maintained in a temperature range of from 23° to 29° C. After completion of the addition nitrogen gas was bubbled through the reaction medium for a period of about 9 hours while the temperature was maintained below 30° C. to complete the reaction and to remove hydrogen chloride by-product and obtain 4-chloro-o-tolyl methyl phosphorochloridate intermediate product.

16 grams (0.5 mole) of methylamine in 40 milliliters of methylene chloride was added with stirring and in portions to one-half of the reaction mixture above prepared and containing 0.25 mole of 4-chloro-o-tolyl methyl phosphorochloridate. During the addition a white solid precipitated in the reaction mixture. After completion of the addition stirring was continued over a period of 5 hours while the mixture was gradually allowed to warm to 28° C. The resulting mixture was extracted with water to remove the white precipitate and the remaining methylene chloride solution dried with anhydrous calcium sulfate, the dried solution heated to distill the solvent and to obtain a 4-chloro-o-tolyl methyl methylphosphoramidate as a light yellow oil. The product has a molecular weight of 249.5.

*Example 8.—4-tertiary-butyl-2-chlorophenyl methyl phosphoroamidate*

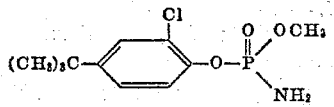

In a manner similar to that previously described, 32 grams (1 mole) of methanol in 150 milliliters of methylene chloride is added with stirring to a cooled solution of 302 grams (1 mole) of 4-tertiary-butyl-2-chlorophenyl phosphorodichloridate in 500 milliliters of methylene chloride. Thereafter, nitrogen gas is bubbled through the mixture for a period of 15 hours while the temperature is maintained between 20° and 30° C. to complete the reaction with the removal of hydrogen chloride by-product and to obtain a 4-tertiary-butyl-2-chlorophenyl methyl phosphorochloridate intermediate product.

34 grams (2 moles) of anhydrous ammonia is added portionwise with stirring and cooling below 15° C. to the solution containing intermediate product prepared above. After completion of the addition, the reaction mixture is gradually warmed to 30° C. over a period of about 2 hours to complete the reaction and to produce a 4-tertiary-butyl-2-chlorophenyl methyl phosphoramidate product and ammonium chloride by-product. The resulting product mixture is washed with water to remove the by-product salt, heated to vaporize the methylene chloride and to recover a 4-tertiary-butyl-2-chlorophenyl methyl phosphoramidate product having a molecular weight of 277.7.

*Example 9*

In a similar manner the following compounds are prepared.

2-chloro-p-tolyl isopropyl phosphoramidate having a molecular weight of 263.5 by the reaction of 2-chloro-p-tolyl phosphorodichloridate with isopropanol to produce an intermediate 2-chloro-p-tolyl isopropyl phosphorochloridate followed by the reaction of the latter with anhydrous ammonia.

4-chloro-2-ethylphenyl ethyl phosphoroamidate having a molecular weight of 263.7 by the reaction of 4-chloro-2-ethylphenyl phosphorodichloridate with ethanol to produce an intermediate 4-chloro-2-ethylphenyl ethyl phosphorochloridate followed by the reaction of the latter with anhydrous ammonia.

5 - tertiary - butyl - 2 - chlorophenyl normal - propyl phosphoramidate having a molecular weight of 305.8 by the reaction of 5-tertiary-butyl-2-chlorophenyl phosphorodichloridate with normal-propanol to produce an intermediate 5-tertiary-butyl-2-chlorophenyl normal-propyl phosphorochloridate followed by the reaction of the latter with anhydrous ammonia.

*Example 10.—2 - chloro - 4 - (1,1 - dimethylpropyl) phenyl methyl methylphosphoramidate*

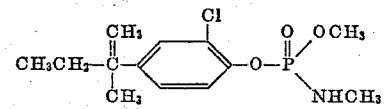

Sixteen grams (0.5 mole) of methanol in 50 milliliters of methylene chloride is added dropwise with stirring to a solution of 142.3 grams (0.5 mole) of 2-chloro-4-(1,1-dimethylpropyl)phenyl phosphorodichloridate in 400 milliliters of methylene chloride. The temperature of the reaction mixture is maintained below 30° C. during the addition. After completion of the addition, the reaction mixture is maintained at about 25° C. while the mixture is agitated and nitrogen gas bubbled therethrough to complete the reaction and to remove the hydrogen chloride by-product and to obtain the intermediate 2-chloro-4-(1,1-dimethylpropyl)phenyl methyl phosphorochloridate.

This reaction mixture containing 0.5 mole of 2-chloro-4-(1,1-dimethylpropyl)phenyl methyl phosphorochloridate is cooled at 3° C. and a solution of 32 grams (1 mole) of methylamine in 100 milliliters of methylene chloride is added thereto portionwise and with stirring over a period of about one-half hour. The temperature is maintained below 15° C. during the addition. After completion of the addition the mixture is warmed to 30° C. to complete the reaction and obtain a 2-chloro-4-(1,1-dimethylpropyl)phenyl methyl methylphosphoramidate product and methylamine·hydrochloride by-product. The reaction mixture is then washed several times with water to remove the methylamine·hydrochloride by-product, warmed to remove the methylene chloride solvent by vaporization and to recover the 2-chloro-4-(1,1-dimethylpropyl)phenyl methyl methylphosphoramidate product as an oily residue having a molecular weight of 305.8.

*Example 11*

603 grams (2 moles) of 4-tertiary-butyl-2-chlorophenyl phosphorodichloridate was dissolved in 1000 milliliters of chloroform and the mixture heated to a temperature of from 54° to 63° C. and maintained under reflux. To the refluxing mixture was added dropwise, 64 grams (2 moles) of methanol over a period of about 2 hours. After completion of the addition, the mixture was maintained under reflux for an additional hour to complete the reaction to produce 4-tertiary-butyl-2-chlorophenyl methyl phosphorochloridate intermediate and hydrogen chloride by-product. Thereafter, the reaction mixture was cooled to room temperature and nitrogen gas passed therethrough to remove any remaining hydrogen chloride by-product.

The resulting mixture containing 4-tertiary-butyl-2-chlorophenyl methyl phosphorochloridate was cooled to about 3° C. and 129.6 grams (4.2 moles) of methylamine added dropwise thereto at a temperature range of from 3° to 16° C. over a period of one and three-quarter hours. After completion of the addition, the mixture was warmed to about 27° over a period of 1 hour and maintained at that temperature for about 1.5 hours to complete the reaction to obtain a 4-tertiary-butyl - 2 - chlorophenyl methyl methylphosphoramidate product and methylamine·hydrochloride by-product as white precipitate. The resulting mixture is washed several times with water to remove the hydrochloride, distilled under reduced pressure to remove the solvent and to recover the 4-tertiary-butyl-2-chlorophenyl methyl methylphosphoramidate product as residue.

The phosphoramidates of this invention are useful products for a variety of agricultural and industrial applications. They are, for example, useful as herbicides for the control of germination and growth of undesirable vegetation such as radish (*Raphanus sativus*) and cranberry bean (*Phaseolus vulgaris cran.*) plants. They are also useful as aquatic herbicides. In a representative operation of its use as an aquatic herbicide, 4-tertiary-butyl-2-chlorophenyl methyl methylphosphoramidate was employed for the control of submersed and floating aquatic weeds Anacharis sp., *Cabomba caroliniana*, *Lysimastrum nummularia* and *Salvinia rotundifolia*. In such operations, substantially complete controls were obtained when the aquatic weeds were exposed for only 1 hour to a tank containing 400 parts by weight of 4-tertiary-butyl-2-chlorophenyl methyl methylphosphoramidate per million parts of aqueous medium. Further, they are useful as parasiticides, for the control of insects, microorganisms, plant pathogens and animal parasites. In a representative operation of its use as a plant pathogen, complete control of wheat rust disease was obtained when wheat plants susceptible to wheat rust disease caused by rust fungus (*Puccinia graminis-tritici*) were sprayed with an aqueous dispersion containing 0.25 pounds of 4-tertiary-butyl-2-chlorophenyl methyl methylphosphoramidate in 100 gallons of spray medium and thereafter inoculated with the disease organism. As insecticides, these compounds are useful for control of insects in all stages of growth and both as contact and as systemic insecticides. Thus, the phosphoramidates of this invention give good control of Mexican bean beetle (*Epilachna varivestis*) and southern armyworm (*Prodenia eridania*) when plants such as cranberry bean plants are sprayed with compositions containing phosphoramidates and thereafter infested with the insects. The phosphoramidates also give good controls of bean aphids (*Aphis fabae*) and two spotted spider mites (*Tetranychus bimaculatus*) when infested plants are sprayed therewith. They are further useful for household pests such as house fly (*Musca domestica*) and cockroach (*Americana periplaneta*).

It has also been discovered that by employing the new phosphoramidates, good control of parasites attacking warm-blooded animals may be obtained. Parasites which may be controlled by this new method include cattle grub, bots, screw-worms, ticks, lice, fleas, mites, helminths and other internal parasites, and flies. Further, the new phosphoramidates are found to be readily assimilable by warm-blooded animals and to control parasites attacking flesh, viscera or vascular system of the animals. The present compounds are effective for controlling parasites in all the life stages. Furthermore, these phosphoramidates are effective for systemically controlling parasites attacking animals without adversely effecting the animals. Thus, these compounds are of low toxicity to the animals and, in addition, they are effective at a very low concentration, heretofore not believed effective. Moreover, these phosphoramidates are not bound or incorporated or otherwise retained by fat and other tissues of warm-blooded animals in the manner and to the extent that is the case with other phosphorus-containing compounds.

The practice of this invention may be accomplished by an oral administration of phosphoramidate, by spraying the animal with a composition comprising the active compound to permit absorption thereof through the skin, or by injecting the animal with a suitable solution of the active compound. In the preferred method for carrying out this invention the phosphoramidate compound is administered to the animal to be treated by intramuscular injection. This method of treatment permits rapid absorption of the unaltered form of the phosphoramidate and further has the advantage of being an effective means for treatment of range cattle and other grazing animals. Furthermore, there is absence of sterile abscesses in their administration.

The phosphoramidates of this invention which are particularly valuable are those which have the structure

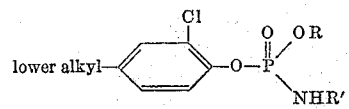

wherein R and R' represent a lower alkyl radical containing from 1 to 4 carbon atoms, and "lower alkyl" refers to an alkyl radical containing from 1 to 5 carbon atoms.

In carrying out this invention a therapeutic dose or dose sufficient to control pathogenic parasites without serious toxic effects on warm-blooded animals is administered to the animal. The exact dose is dependent on the parasite to be controlled and the particular phosphoramidate compound employed, as well as upon whether the administration is to be made in a single dose or in multiple doses over a period of several days. Where a single dose is employed for the control of helminths, good results are obtained when the phosphoramidates are administered at a dosage of 50 to 150 milligrams per kilogram of body weight of the animal. For the control of flies, fleas, lice and ticks, good results are obtained when the phosphoramidates are employed at dosages as low as 20 milligrams per kilogram of body weight, while for the control of screw-worms and cattle grubs, the phosphoramidates give good controls at dosages of 2.5 milligrams per kilogram or more of body weight. If desired, the compounds may be administered in multiple doses over a period of several days. In such operations, it is preferred to employ a daily dosage of from 0.5 to 15 milligrams per kilogram of body weight.

The process of this invention may be carried out by intramuscular injection of a solution of the phosphoramidate compound in a suitable medium. By suitable medium is meant an inert liquid carrier which will not bring about degradation of the phosphoramidate compound and further will not irritate or adversely affect the animal to be treated. Suitable liquid carriers include diethyl succinate, ethyl acetate, propylene glycol, ethyl lactate, diethyl adipate, peanut oil, and sesame oil.

The systemic control by the novel compounds may also be achieved by administering the phosphoramidate to the animals, orally in the unmodified form such as in gelatin capsules or pellets, or in admixture with an innocuous adjuvant such as ethanol, water, skimmed milk, syrups, edible oils, or other edible carriers; surface active dispersing agents, edible powders, commercial animal feeds, concentrates and mineral and vitamin supplements. The compounds may also be administered as a spray, preferably in a non-aqueous medium such as in isoparaffin oil. The latter, boiling the range of kerosene is characterized by low odor, low phytotoxicity and lower toxicity to animals than ordinary hydrocarbon oils of the same boiling range and contain no more than traces of olefins, naphthenes or aromatics and low percentage of normal paraffins. Other liquid medium normally employed for animal spray such as kerosene and diesel fuel, as well as aqueous spray compositions wherein the phosphoramidate is dispersed with a suitable emulsifying or dispersing agent may also be employed.

The exact concentration of the phosphoramidate compounds to be employed in the compositions may vary provided that a sufficient amount be administered to provide the required dosage of the active agent. For example, where direct administration by intramuscular injection is to be employed, it is generally desirable that the injectible solution contain a fairly high concentration of the active agent. A liquid composition containing from about 35 to 55 percent of the agent is considered most practicable. Where direct oral administration to an animal is to be employed, liquid or solid compositions containing from 4 to 95 percent by weight of the phosphoramidate may be used to supply the desired dosage. Where the compounds are provided as a constituent of the principal food ration, satisfactory results are obtained with food rations containing a minor but effective amount of the phosphoramidate compounds. The exact amount of the compound to be incorporated in the ration is dependent upon the food consumption and feeding habits of the animals concerned. In animals such as pigs and mice, the required dosage may be supplied with feed compositions containing from 0.01 to 1 percent by weight of active agent. In fowl, the required dosage may be supplied with mash compositions containing from 0.01 to 0.25 percent by weight of the systemic agents. Where the compound is provided as a constituent of feed supplements, good results are obtained with supplements containing from 0.5 to 5 percent by weight of the phosphoramidate compounds. In compositions to be employed as concentrates the active agents may be present in a concentration of from 5 to 95 percent by weight.

The administration of a phosphoramidate composition by intramuscular injection constitutes the preferred embodiment of the present invention. Such compositions and methods have been found to be of very low toxicity to the warm-blooded animal and to give outstanding controls of parasites.

Although the methods and compositions of the present invention and the phosphorus compounds therein employed are useful for the control of a number of parasites in warm-blooded animals, such teaching is not to be construed that the methods, compositions and compounds are equivalents for the control of a particular parasite or the life stage of such parasite, or for the control of such parasite or life stage thereof in a particular animal.

Since many of the parasites are seasonal in their appearance, the present invention is advantageously practiced with certain parasites at a particular time of the year. Thus, with cattle grubs, *Hypoderma lineatum* and *bovis,* it is preferred that the administration for their control be carried out in the fall and quite soon after the disappearance of the heel and bomb flies. The disappearance of these flies varies somewhat depending upon the climate. For the control of the cattle grub, *Dermatobia hominis,* in the Central and South American countries, it is desirable that the administration be carried out about four times each year. When following such practices good controls of cattle grubs are obtained with a minimum of damage to the animal from the migration of the grub. Further, the grubs are controlled before they have a chance to adversely affect the animal or its rate of growth, or reduce the value of the animal's hide.

The control of animal parasites attacking warm-blooded animals by the administration of phosphoramidates is illustrated by the following examples:

*Example 12*

The phosphoramidate compounds represented by the structure

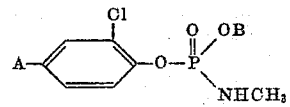

wherein A is tertiary-butyl, tertiary-amyl or isopropyl and B is methyl or ethyl are employed as systemic agents for the control of cattle grub in yearling calves infested therewith. In such operations, each phosphoramidate compound is administered by intramuscular injection. The injectible solution is administered by injection in the hip of the animal in an amount sufficient to supply a dosage of 50 milligrams per kilogram of body weight. A group of similarly infested yearling calves is left untreated to serve as checks.

The injectible solution was prepared by dissolving the phosphoramidate compound in diethyl succinate to provide a concentration of 500 milligrams of the phosphoramidate per milliliter of solution.

At intervals of four and eight weeks following treatment, the calves are examined and weighed. The examination shows that the treatments have no adverse effect on the animal or on the growth rate.

20 weeks following treatment the animals are examined for evidence of nodular dermal cysts caused by cattle grub larvae. Cattle treated with phosphoramidate compounds are found to harbor 2 or less grub larvae while untreated calves harbor an average of 10 live larvae per animal.

*Example 13*

3.32 milliliters of diethyl succinate solution of 4-tertiary-butyl-2-chlorophenyl methyl methylphosphoramidate prepared as described in Example 12 was injected intramuscularly in the hip of a 166 kilogram calf infested with cattle grub.

The dosage is sufficient to supply 10 milligrams of 4-tertiary-butyl-2-chlorophenyl methyl methylphosphoramidate per kilogram of body weight. At the time of the injection, the back was examined for nodular dermal cysts harboring live cattle grub larvae. Eight days after treatment, the back was again examined for cattle grub and found that there were no live grubs. Observation of the calf after treatment indicated that there were no adverse effects attributable to the phosphoramidate compound.

*Example 14*

A 146 kilogram calf infested with cattle grub and heavily infested in an area of a neck wound with screwworm larvae was injected in the hip with 8.8 milliliters of a diethyl succinate solution of 4-tertiary-butyl-2-chlorophenyl methyl methylphosphoramidate prepared as described in Example 12.

The dosage is sufficient to supply 30 milligrams of 4-tertiary-butyl-2-chlorophenyl methyl methylphosphoramidate per kilogram of body weight. Twenty-four hours following the administration, the wounds were examined and found to be free of screw-worms. Examination of the wounds after several days showed marked healing with the wounds scabbed over and much reduced in size.

Three days after treatment, the calf was examined for cysts harboring live cattle grub larvae. No live grubs were found on the calf. Prior to treatment, 8 live grubs had been found on the calf. No adverse effect attributable to the administration of the phosphoramidate compound was noted.

*Example 15*

4-tertiary-butyl-2-chlorophenyl methyl methylphosphoramidate was employed as a systemic agent for the control of stable flies feeding on the skin surfaces of cattle. The composition employed and the dosing operation was as described in Example 14 with the phosphoramidate compound being administered to a calf at a dosage of 30 milligrams per kilogram of body weight.

Two hours after injection, stable flies were allowed to feed on the skin of the animal for a period of 15 minutes and thereafter caged and observed for 24 hours for mortality. As the result of the treatment good control of stable flies feeding on the calf dose with 4-tertiary-butyl-2-chlorophenyl methyl methylphosphoramidate was observed. No adverse effect on the calf attributable to the phosphoramidate compound was observed following the treatment.

*Example 16*

A sheep weighing 22.7 kilograms and voiding an average of 4,547 ova of gastro-intestinal nematodes per gram of feces was treated with unmodified 4-tertiary-butyl-2-chlorophenyl methyl methylphosphoramidate in a gelatin capsule. The ova included those of Bunostomum sp., Haemonchus sp., Oesophagostomum sp., Ostertagi sp., Trichostrongylus sp., and Cooperia sp. The amount administered corresponded to 132 milligrams per kilogram of body weight. Following the treatment, the sheep voided large numbers of nematodes. Seven days following the treatment, the feces were examined and found to be substantially free of nematode ova.

*Example 17*

Various phosphoramidates, 4-tertiary-butyl-2-chlorophenyl ethyl methylphosphoramidate, 4-isopropyl-2-chlorophenyl methyl isopropylphosphoramidate, 2-chloro-p-tolyl isopropyl methylphosphoramidate and 4-tertiary-butyl-2-chlorophenyl methyl methylphosphoramidate are employed as systemic agents for the control of stable flies feeding on the skin of mice. In such operations, the various phosphoramidates are directly introduced into the stomach of the mouse at a dosage of 200 milligrams per kilogram of body weight. One hour following the introduction, the mice are restrained and 10 to 15 stable flies allowed to feed on the animal for a period of one hour. The stable flies are thereafter observed for 24 hours for mortality. It is found that at the dosage of 200 milligrams per kilogram, the mortality of the stable fly is over 90 percent. Stable flies fed on untreated check mice show no mortality after 24 hours.

*Example 18*

Six head of cattle infested with bot larvae (*Dermatobia hominis*) are injected in the hip with an injectible ethyl acetate solution of 4-tertiary-butyl-2-chlorophenyl methyl methylphosphoramidate prepared in a manner similar to that described in Example 12 at a dose of 10 milligrams per kilogram. On the third day following treatment, the efficacy of the treatment is determined by extracting all bots from the cyst and determining the percentage that have been killed. It is found that in all of the cattle thus treated, substantially complete kill is obtained. Examination of the cattle five weeks after treatment shows no reinfestation with bots. During this period no toxicity or injurious effect to the cattle is seen.

*Example 19*

150 milliliters of a spray composition containing 5.04 grams of 4-tertiary-butyl-2-chlorophenyl methyl methylphosphoramidate in isoparaffin oil having a flash point of 130° F. was applied to the skin surfaces of a 168 kilogram cow infested with live screw-worm larvae. The dosage is 30 milligrams per kilogram of body weight. Application was made so that the spray did not come in direct contact with the larvae. 5 hours after administration, examination revealed that all the larvae were dead.

*Example 20*

In a field test conducted in late fall soon after the heel and bot flies deposited eggs, 18 calves having an average weight of 350 pounds are taken for systemic grub control treatment. No grubs are visible on the backs of the calves at this time. Three of the calves are injected with a diethyl succinate solution of 4-tertiary-butyl-2-chlorophenyl methyl methylphosphoramidate prepared as described in Example 12, at a dosage of 10 milligrams per kilogram. The 15 remaining calves are left untreated as controls. Thereafter, the cattle are examined on the backs for development of nodular dermal cysts harboring live cattle grub larvae. After two weeks some of the calves develop nodular dermal crysts harboring grubs. Observations are made every two weeks. Grub counts made 11 weeks after the start of the treatment show that the treated calves have an average of 0 grubs per head, whereas untreated control calves have an average of 38 grubs per head.

*Example 21*

Concentrate compositions are prepared containing at least one of the following phosphoramidates as active toxicant: 4-tertiary-butyl-2-chlorophenyl methyl methylphosphoramidate, 2-chloro-4-(1,1-dimethylpropyl)phenyl methyl methylphosphoramidate, 4-tertiary-butyl-2-chlorophenyl methyl ethylphosphoramidate, 4-tertiary-butyl-2-chlorophenyl methyl isopropylphosphoramidate, and 2-chloro-4-isopropylphenyl ethyl methylphosphoramidate. The concentrate compositions are wettable powders containing 25 parts by weight of phosphorus compound, 44 parts of kaolin clay, 28 parts of diatomaceous earth, 2 parts of a polymerized sodium salt of a substituted benzoid alkyl sulfonic acid (Daxad Number 27) and 1 part of sodium naphthalene sulfonate (Nekal A). These ingestible concentrate compositions are prepared by mechanically mixing and grinding together the indicated constituents.

19.2 grams of the concentrate composition containing 4.8 grams of 4-tertiary-butyl-2-chlorophenyl methyl methylphosphoramidate prepared as above described is dispersed in 150 milliliters of water to obtain an aqueous drench. The aqueous drench is orally administered to a 96 kilogram calf heavily infested with short nosed cattle louse, *Haematopenus eurysternus*. At the time of injection, thousands of lice are found on the cow, and the skin along the side of the neck and brisket are denuded of hair by the parasite. The amount administered is sufficient to supply 50 milligrams of 4-tertiary-butyl-2-chlorophenyl methyl methylphosphoramidate per kilogram of body weight of the cow. Examination of the skin surfaces of the cow at the end of 24 hours following treatment show 100 percent kill of the short nosed cattle louse.

*Example 22*

A portion of the concentrate composition containing 2-chloro - 4 - (1,1-dimethylpropyl)phenyl methyl methylphosphoramidate compound prepared as described in Example 21 is dispersed in grain ration to produce an animal feed containing 3.3 grams of 2-chloro-4-(1,1-dimethylpropyl)phenyl methyl methylphosphoramidate per six pounds of feed. This composition is fed for a period of seven days to a yearling calf weighing 300 pounds and voiding a large number of nematode ova in an amount sufficient to supply 25 milligrams of phosphoramidate compound per kilogram of body weight. Following treatment, examination of the feces shows substantially complete reduction in number of nematode ova.

*Example 23*

Portions of the concentrate compositions containing 4-tertiary-butyl - 2 - chlorophenyl methyl isopropylphosphoramidate and 2-chloro-4-isopropylphenyl ethyl methylphosphoramidate and prepared as described in Example 21 are dispersed in a commercial poultry mash to prepare feed compositions containing 0.2 percent by weight of phosphoramidate compound. These compositions are fed as a sole ration for a period of 2.5 months to two flocks of chickens. Each flock consists of ten adult chickens of same history and past environment. The compositions are fed in amounts sufficient to supply dosages of 130 milligrams of phosphoramidate compound per kilogram of body weight. A similar flock is fed unmodified mash to serve as checks. Such treatment controls blood-sucking parasites of fowls such as fleas (*Ceratophyllus gallinae*), fowl ticks (*Argas pericus*) and mites (*Dermanyssus gallinae*).

Example 24

Concentrate compositions prepared as described in Example 21 are dispersed in water to produce a spray composition containing 0.75 part by weight of the phosphoramidate compound. These compositions are adapted to be employed to supply a chemotherapeutic dose of a phosphoramidate compound. When so employed these compositions give good control of many parasites attacking animals.

We claim:

1. A phosphoramidate having the formula

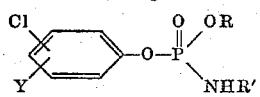

wherein R represents a lower alkyl radical containing from 1 to 4 carbon atoms, inclusive, R' represents a member of the group consisting of hydrogen and a lower alkyl radical containing from 1 to 4 carbon atoms, inclusive, and Y represents a lower alkyl radical containing from 1 to 5 carbon atoms, inclusive.

2. 4-tertiary-butyl-2-chlorophenyl methyl methylphosphoramidate.

3. 2-chloro-4-(1,1-dimethylpropyl)phenyl methyl methylphosphoramidate.

4. 4-tertiary-butyl - 2 - chlorophenyl methyl ethylphosphoramidate.

5. 4-tertiary-butyl - 2 - chlorophenyl methyl isopropylphosphoramidate.

6. 2-chloro - 4 - isopropylphenyl ethyl methylphosphoramidate.

7. A method for controlling parasites attacking warm-blooded animals which comprises administering to the animal a chemotherapeutic dosage of a systemic agent comprising a phosphoramidate having the formula

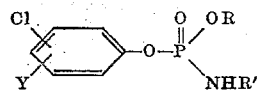

wherein R represents a lower alkyl radical containing from 1 to 4 carbon atoms, inclusive, R' represents a member of the group consisting of hydrogen and a lower alkyl radical containing from 1 to 4 carbon atoms, inclusive, and Y represents a lower alkyl radical containing from 1 to 5 carbon atoms, inclusive.

8. In the practice of animal husbandry, the step of administering to a warm-blooded animal a systemic agent in an amount sufficient to provide from 0.5 to 150 milligrams of the systemic agent per kilogram of body weight of the animal, said systemic agent being a phosphoramidate having the formula

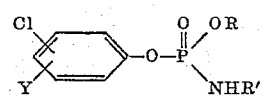

wherein R represents a lower alkyl radical containing from 1 to 4 carbon atoms, inclusive, R' represents a member of the group consisting of hydrogen and a lower alkyl radical containing from 1 to 4 carbon atoms, inclusive, and Y represents a lower alkyl radical containing from 1 to 5 carbon atoms, inclusive.

9. A composition comprising a systemic agent, said systemic agent being a phosphoramidate having the formula

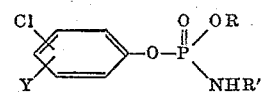

wherein R represents a lower alkyl radical containing from 1 to 4 carbon atoms, inclusive, R' represents a member of the group consisting of hydrogen and a lower alkyl radical containing from 1 to 4 carbon atoms, inclusive, and Y represents a lower alkyl radical containing from 1 to 5 carbon atoms, inclusive, and in intimate admixture therewith, an innocuous adjuvant.

References Cited in the file of this patent

UNITED STATES PATENTS

| | | |
|---|---|---|
| 2,836,612 | Kauer et al. | May 27, 1958 |
| 2,852,469 | Hugel et al. | Sept. 16, 1958 |
| 2,855,425 | Tolkmith et al. | Oct. 7, 1958 |